United States Patent
Tseng et al.

(10) Patent No.: US 10,261,309 B2
(45) Date of Patent: Apr. 16, 2019

(54) LIQUID LENS CHIP, DRIVING APPARATUS AND DRIVING METHOD THEREOF

(71) Applicant: National Tsing Hua University, Hsinchu (TW)

(72) Inventors: Fan-Gang Tseng, Taipei (TW); Pen-Cheng Wang, Hsinchu (TW); Po-Wei Hu, New Taipei (TW); Hsien-Lung Ho, Taoyuan (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/476,733

(22) Filed: Mar. 31, 2017

(65) Prior Publication Data
US 2018/0164576 A1    Jun. 14, 2018

(30) Foreign Application Priority Data
Dec. 12, 2016    (TW) .............................. 105141091 A

(51) Int. Cl.
*G02B 26/00* (2006.01)
*G02B 3/14* (2006.01)

(52) U.S. Cl.
CPC .............. *G02B 26/004* (2013.01); *G02B 3/14* (2013.01)

(58) Field of Classification Search
CPC .......... G02B 3/12; G02B 3/14; G02B 26/004; G02B 1/06; G02B 9/02; G02B 13/0025; G02B 13/0075; G02B 26/005; G02B 26/10; G02B 26/101; G02B 26/103; G02B 2207/115; H04N 3/06

(Continued)

(56) References Cited

U.S. PATENT DOCUMENTS 4,636,785 A * 1/1987 Le Pesant ............... G09F 9/372
                                                                   345/37
5,033,806 A * 7/1991 Tomita ................... B23K 26/08
                                                                  250/201.1

(Continued)

FOREIGN PATENT DOCUMENTS

CN    101514802    8/2009
CN    101828132    9/2010

(Continued)

OTHER PUBLICATIONS

Chih-Cheng Cheng et al., "Variable focus dielectric liquid droplet lens", Optics Express 14, 4101, Apr. 2006, 1-6.

(Continued)

*Primary Examiner* — Jordan M Schwartz
(74) *Attorney, Agent, or Firm* — J.C. Patents

(57) ABSTRACT

A liquid lens chip, a driving apparatus and a driving method thereof are provided. The driving apparatus includes a carrier and a driver. The carrier is configured to carry a liquid lens and has a plurality of electrode pairs in contact with the liquid lens. The driver provides a periodic first driving signal to a selected electrode pair of the electrode pairs during a first time period according to a scan control signal to change a shape of the liquid lens. The driver further provides a periodic second driving signal to an opposite electrode pair opposite to the selected electrode pair during a second time period to recover the shape of the liquid lens which has been changed during the first time period.

12 Claims, 6 Drawing Sheets

(58) Field of Classification Search
USPC .............. 359/665, 666; 351/159.04, 159.34
See application file for complete search history.

(56) References Cited

U.S. PATENT DOCUMENTS

| | | | | |
|---|---|---|---|---|
| 2004/0055891 | A1* | 3/2004 | Pamula | B01F 11/0071 |
| | | | | 1/71 |
| 2006/0079728 | A1* | 4/2006 | Kuiper | A61B 1/0019 |
| | | | | 600/9 |
| 2009/0096999 | A1* | 4/2009 | Frahm | B82Y 20/00 |
| | | | | 353/101 |
| 2009/0174765 | A1 | 7/2009 | Namba et al. | |
| 2010/0279374 | A1* | 11/2010 | Sista | B01F 11/0071 |
| | | | | 435/173.9 |
| 2012/0170134 | A1* | 7/2012 | Bolis | G02B 3/14 |
| | | | | 359/666 |
| 2012/0170920 | A1* | 7/2012 | Moreau | G02B 3/14 |
| | | | | 396/72 |

FOREIGN PATENT DOCUMENTS

| | | |
|---|---|---|
| CN | 102354065 | 2/2012 |
| CN | 203217103 | 9/2013 |
| CN | 103487963 | 1/2014 |
| CN | 105158827 | 12/2015 |
| TW | I315321 | 10/2009 |
| TW | 201321798 | 6/2013 |
| TW | 201439597 | 10/2014 |

OTHER PUBLICATIONS

Miao Xu et al., "Tunable Focus Liquid Lens with Radial-Patterned Electrode", Micromachines 2015, Aug. 2015, 1157-1165.

Po-Wei Hu et al., "An Electrically Tunable Asymmetrical Liquid Lens System for Optical Coherent Tomography", MicroTAS 2015, Oct. 2015, 1-3.

Po-Wei Hu et al., "An Electrically Tunable Asymmetrical Liquid Lens System for Optical Coherent Tomography", Biosensor 2016, May 2016, 1-2.

Po-Wei Hu et al., "An Electrically Tunable Asymmetrical Liquid Lens System for Optical Coherent Tomography", Electrowetting 2016, Jun. 2016, 1-1.

"Office Action of Taiwan Counterpart Application," dated May 23, 2017, p. 1-p. 8, in which the listed references were cited.

* cited by examiner

LIQUID LENS CHIP, DRIVING APPARATUS AND DRIVING METHOD THEREOF

CROSS-REFERENCE TO RELATED APPLICATION

This application claims the priority benefit of Taiwan application serial no. 105141091, filed on Dec. 12, 2016. The entirety of the above-mentioned patent application is hereby incorporated by reference herein and made a part of this specification.

BACKGROUND OF THE INVENTION

Field of the Invention

The invention relates to a liquid lens chip, a driving apparatus, and a driving method thereof and more particularly relates to a liquid lens chip, a driving apparatus, and a driving method thereof that improve the scan rate.

Description of Related Art

In the field of biomedical technology, a liquid lens has been proposed. The shape of the liquid lens may be changed irregularly when the liquid lens is driven by an electrical signal, and such irregular shape changes can be used to refract light back and forth, so as to achieve image scanning, which is applicable to biomedical imaging technology.

SUMMARY OF THE INVENTION

The invention provides a liquid lens chip, a driving apparatus, and a driving method thereof, which effectively enhance a reaction rate of a liquid lens to improve the resolution of a scanned image.

A driving apparatus of a liquid lens of the invention includes a carrier and a driver. The carrier carries the liquid lens and includes a plurality of electrode pairs in contact with the liquid lens. The driver provides a periodic first driving signal to a selected electrode pair of the electrode pairs during a first time period according a scan control signal so as to change a shape of the liquid lens, and provides a periodic second driving signal to an opposite electrode pair opposite to the selected electrode pair during a second time period so as to recover the shape of the liquid lens that has been changed.

In an embodiment of the invention, the driver includes a controller, a periodic signal generator, and a selector. The controller generates a scan enabling signal and the scan control signal according to a scan instruction. The periodic signal generator is coupled to the controller and generates the first driving signal and the second driving signal according to the scan enabling signal. The selector is coupled to the controller, the periodic signal generator, and the electrode pairs, and according to the scan control signal, enables the first driving signal to be provided to the selected electrode pair during the first time period and enables the second driving signal to be provided to the opposite electrode pair during the second time period.

A driving method of a liquid lens of the invention includes: disposing a plurality of electrode pairs to be in contact with the liquid lens; providing a periodic first driving signal to a selected electrode pair of the electrode pairs during a first time period according to a scan control signal so as to change a shape of the liquid lens; and providing a periodic second driving signal to an opposite electrode pair opposite to the selected electrode pair during a second time period so as to recover the shape of the liquid lens that has been changed.

A liquid lens chip of the invention includes a liquid lens and a carrier. The carrier includes a plurality of electrode pairs that are arranged opposite to one another. The electrode pairs together surround the liquid lens. Each of the electrode pairs has a plurality of extension parts. The extension parts of each of the electrode pairs extend in a direction toward the liquid lens. The liquid lens is in contact with the extension parts of each of the electrode pairs, and is electrically connected with the electrode pairs.

Based on the above, according to the invention, after the shape of the liquid lens is changed, the driving signal is provided to the electrode pair opposite to the direction of the shape change, so as to quickly recover the shape of the liquid lens. Thereby, the liquid lens has a high-speed settling time to improve the scan rate thereof, increase the number of images that can be obtained in a unit time, and enhance the resolution of the images.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
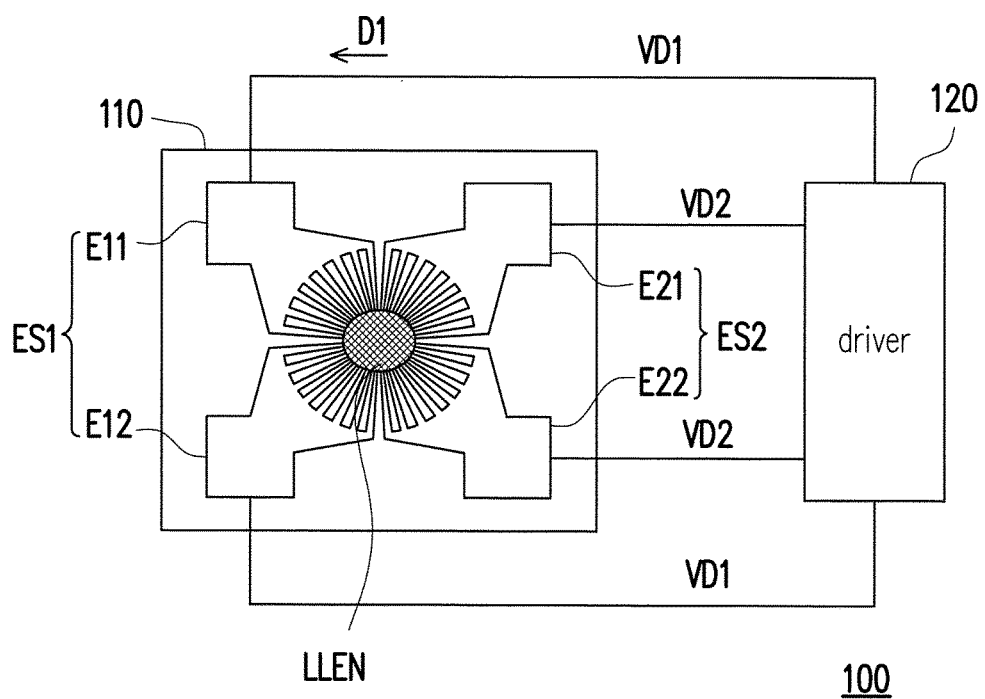
FIG. 1 is a schematic diagram illustrating a driving apparatus of a liquid lens according to an embodiment of the invention.

Referring to FIG. 1, FIG. 1 is a schematic diagram illustrating a driving apparatus of a liquid lens according to an embodiment of the invention. A driving apparatus 100 includes a carrier 110 and a driver 120. A plurality of electrodes E11, E12, E21, and E22 are disposed on an upper surface of the carrier 110, wherein the electrodes E11 and E12 form an electrode pair ES1 and the electrodes E21 and E22 form an electrode pair ES2. The carrier 110 further carries a liquid lens LLEN, wherein the electrodes E11, E12, E21, and E22 are respectively in contact with different parts of the liquid lens LLEN and are electrically connected with the liquid lens LLEN.

The driver 120 is coupled to the electrodes E11, E12, E21, and E22 on the carrier 110. The driver 120 may provide a driving signal VD1 to the electrodes E11 and E12 of the electrode pair ES1 and may provide a driving signal VD2 to the electrodes E21 and E22 of the electrode pair ES2. The driving signal VD1 and the driving signal VD2 are periodic signals. For example, the driving signal VD1 and the driving signal VD2 may be periodic signals of a triangular wave, a sine wave, a square wave, or any other waveform.

It should be mentioned that when the electrode pair ES1 or ES2 receives the driving signal (the driving signal VD1 or the driving signal VD2), a shape of the liquid lens LLEN is partially changed due to the electrical signal (e.g., the driving signal VD1) transmitted by the electrode pair (e.g., the electrode pair ES1), which is equivalent to a movement of the liquid lens LLEN toward a direction D1.

Figure 2A:
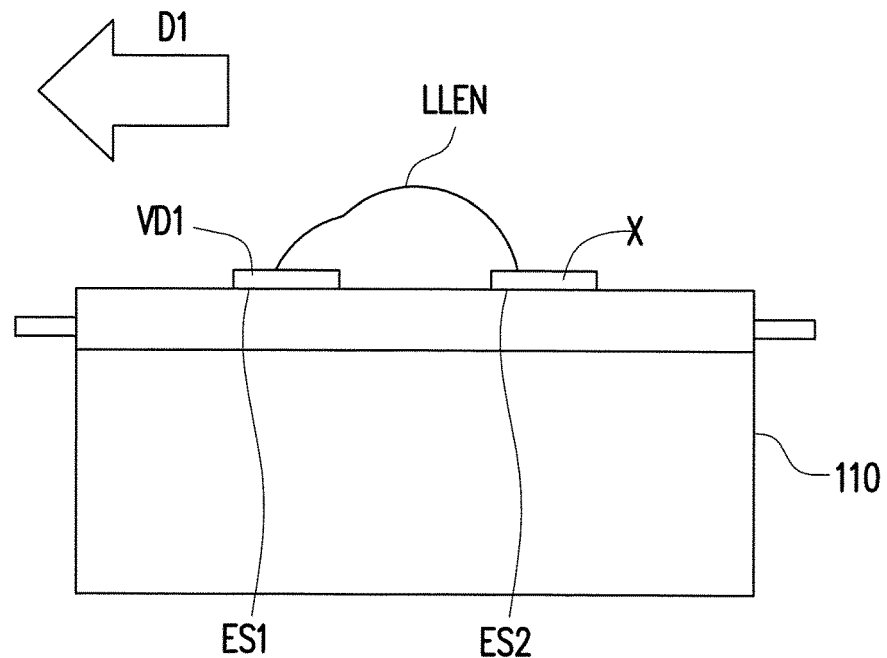
FIG. 2A and FIG. 2B are schematic diagrams illustrating a scan operation of the driving apparatus 100 according to an embodiment of the invention.
Figure 2B:
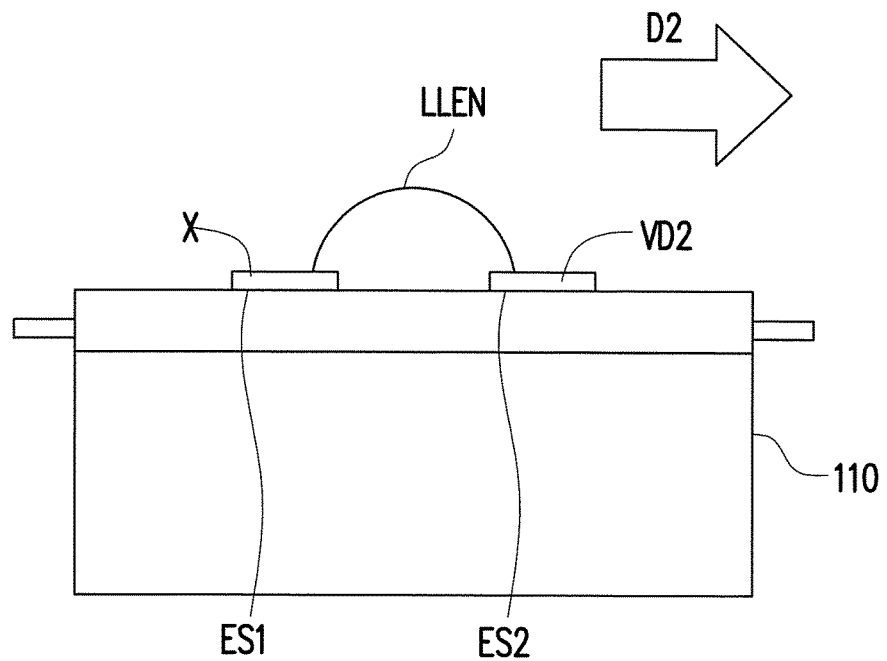

Regarding details of an operation of the driving apparatus 100, referring to FIG. 2A and FIG. 2B, FIG. 2A and FIG. 2B are schematic diagrams illustrating a scan operation of the driving apparatus 100 according to an embodiment of the invention. In FIG. 2A, when the scan operation of the liquid lens LLEN is performed, the driver 120 receives a scan instruction and generates a scan control signal according to the scan instruction. According to the scan control signal, the driver 120 selects the electrode pair ES1 as a selected electrode pair during a first time period and provides the driving signal VD1 to the electrode pair ES1, so as to change the shape of the liquid lens LLEN. At the moment, the electrode pair ES2 opposite to the electrode pair ES1 remains in a float state. That is, during the first time period, the driver 120 does not provide the electrical signal to the electrode pair ES2.

Then, in FIG. 2B, during a second time period that follows the first time period, the driver 120 selects the electrode pair ES2 that is arranged opposite to the electrode pair ES1 and provides the driving signal VD2 to the opposite electrode pair (the electrode pair ES2), so as to change the shape of the liquid lens LLEN along a direction D2 (opposite to the direction D1) and recover the shape of the liquid lens LLEN that has been changed during the first time period. It should be noted that, during the second time period, the electrode pair ES1 is in the float state.

It is known from the above that the recovery of the liquid lens LLEN is controlled by the driving signal VD2 provided to the electrode pair ES2 during the second time period, and a recovery rate thereof is increased to improve an image scan rate.

In the embodiment described above, the driving signal VD1 and the driving signal VD2 may be the same or different signals. Specifically, if the driving signal VD1 and the driving signal VD2 are the same signals, the driving signal VD1 and the driving signal VD2 are the same in waveform, amplitude, frequency, and phase. If the driving signal VD1 and the driving signal VD2 are different signals, the driving signal VD1 and the driving signal VD2 may be different in at least one of waveform, amplitude, frequency, and phase. The setting of the driving signal VD1 and the driving signal VD2 may be related to the shape change rate and recovery rate of the liquid lens LLEN that are to be controlled. The setting is not particularly limited and may be modified by the designer according to the actual requirements.

Figure 3:
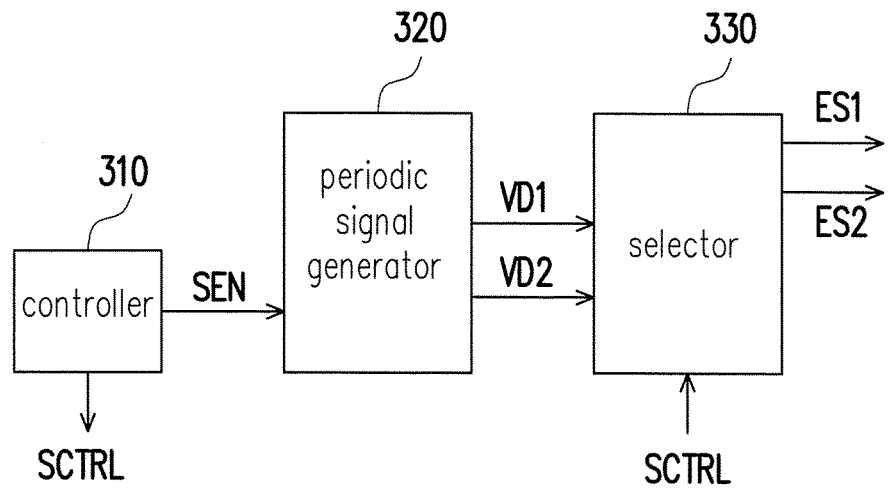
FIG. 3 is a schematic diagram illustrating the driver according to an embodiment of the invention.

Hereinafter, referring to FIG. 3, FIG. 3 is a schematic diagram illustrating the driver according to an embodiment of the invention. A driver 300 includes a controller 310, a periodic signal generator 320, and a selector 330. The controller 310 generates a scan enabling signal SEN and a scan control signal SCTRL according to the scan instruction. The scan enabling signal SEN indicates that the image scan operation has been enabled while the scan control signal SCTRL controls the direction of image scan. The periodic signal generator 320 is coupled to the controller 310 and receives the scan enabling signal SEN. When the scan enabling signal SEN indicates that the image scan operation has been enabled, the periodic signal generator 320 may generate at least one of the periodic driving signals VD1 and VD2 and provides the driving signal VD1 or VD2 to the selector 330.

The selector 330 is coupled to the controller 310, the periodic signal generator 320, and the electrode pairs ES1 and ES2 of the carrier. The selector 330 receives the scan control signal SCTRL and selects one of the driving signals VD1 and VD2 according to the scan control signal SCTRL and provides it to one of the electrode pairs ES1 and ES2.

A specific example of the driver 300 is described with reference to FIG. 2A and FIG. 2B. When the liquid lens LLEN is enabled to perform image scan along the direction D1, the controller 310 generates the corresponding scan enabling signal SEN and scan control signal SCTRL. The periodic signal generator 320 generates the driving signals VD1 and VD2 during the first time period according to the scan enabling signal SEN and provides the driving signals VD1 and VD2 to the selector 330. The selector 330 provides the driving signal VD1 to the electrode pair ES1 of the carrier 110 according to the scan control signal SCTRL so as to change the shape of the liquid lens LLEN along the direction D1.

Next, during the second time period, the controller 310 adjusts the generated scan control signal SCTRL. Meanwhile, the selector 330 provides the driving signal VD2 to the electrode pair ES2 of the carrier 110 according to the adjusted scan control signal SCTRL so as to recover the shape of the liquid lens LLEN that has been changed.

Figure 4:
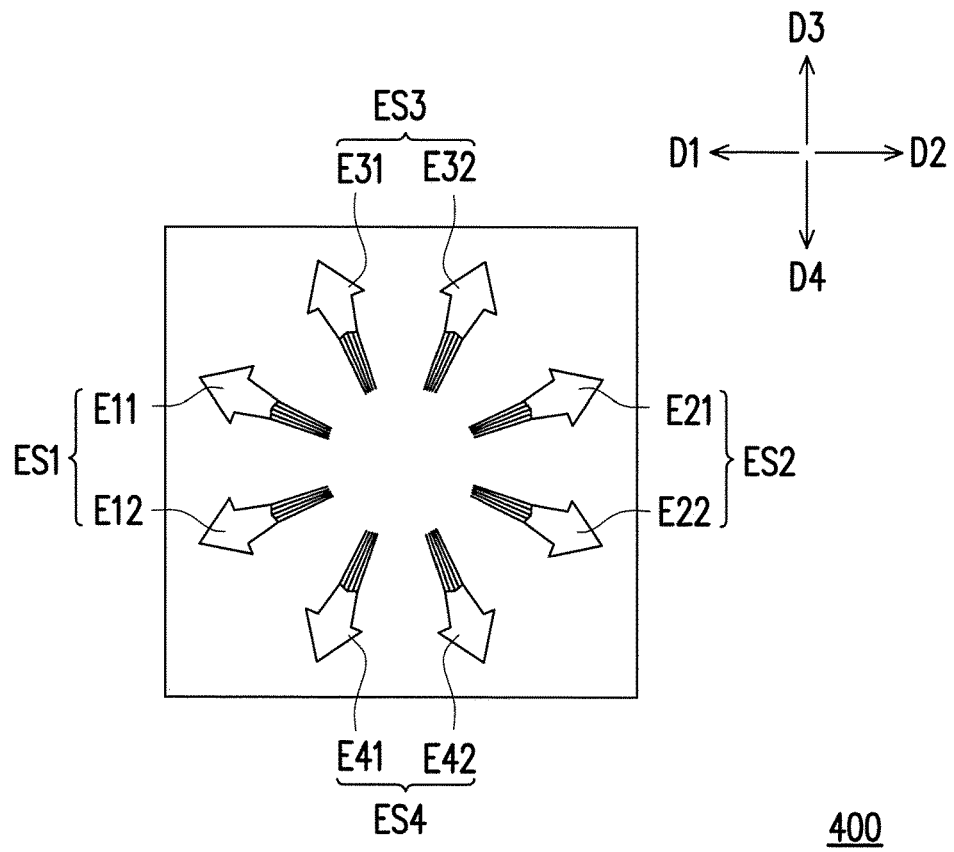
FIG. 4 is a schematic diagram illustrating another embodiment of the carrier according to an embodiment of the invention.

Referring to FIG. 4, FIG. 4 is a schematic diagram illustrating another embodiment of the carrier according to an embodiment of the invention. In FIG. 4, electrodes E11, E12, E21, E22, E31, E32, E41, and E42 are disposed on a surface of a carrier 400. The electrodes E11 and E12 form an electrode pair ES1. The electrodes E21 and E22 form an electrode pair ES2. The electrodes E31 and E32 form an electrode pair ES3. The electrodes E41 and E42 form an electrode pair ES4. The electrode pair ES1 controls the liquid lens LLEN to move along the direction D1; the electrode pair ES2 controls the liquid lens LLEN to move along the direction D2; the electrode pair ES3 controls the liquid lens LLEN to move along a direction D3; and the electrode pair ES4 controls the liquid lens LLEN to move along a direction D4. The direction D1 and the direction D2 are opposite directions, the direction D3 and the direction D4 are opposite directions, and the direction D1 and the direction D3 are substantially perpendicular.

Figure 5A:
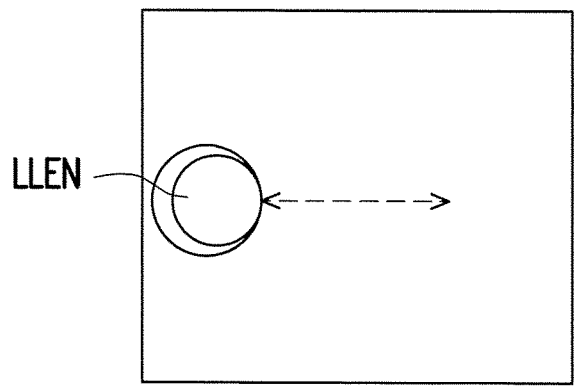
FIG. 5A and FIG. 5B are schematic diagrams respectively illustrating the image scan operation of the liquid lens of the embodiment of the invention in different dimensions.
Figure 5B:
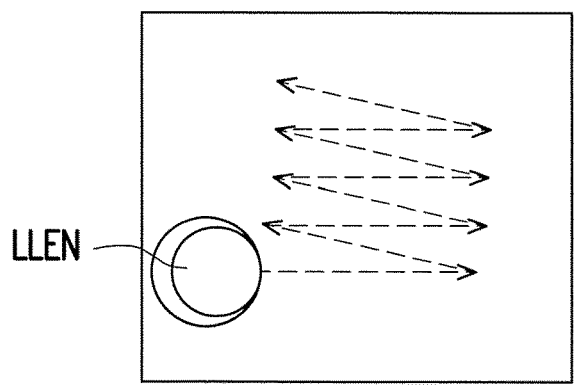

With the configuration of the carrier 400 shown in FIG. 4, the liquid lens LLEN is able to execute scan operations in different dimensions. Referring to FIG. 5A and FIG. 5B, FIG. 5A and FIG. 5B are schematic diagrams respectively illustrating the image scan operation of the liquid lens of the embodiment of the invention in different dimensions. In FIG. 5A, the liquid lens LLEN is able to perform a two-dimensional image scan operation with two opposite electrode pairs (e.g., the electrode pairs ES1 and ES2). In FIG. 5B, the liquid lens LLEN is able to perform a threedimensional image scan operation with four electrode pairs ES1 to ES4, wherein the electrode pairs ES1 and ES2 are opposite, and the electrode pairs ES3 and ES4 are opposite.

These scan operations may be accomplished by properly controlling the sequences of providing the driving signals to the electrode pairs ES1 to ES4. In the embodiment of the invention, the sequences may be defined in the scan control signal.

Figure 6:
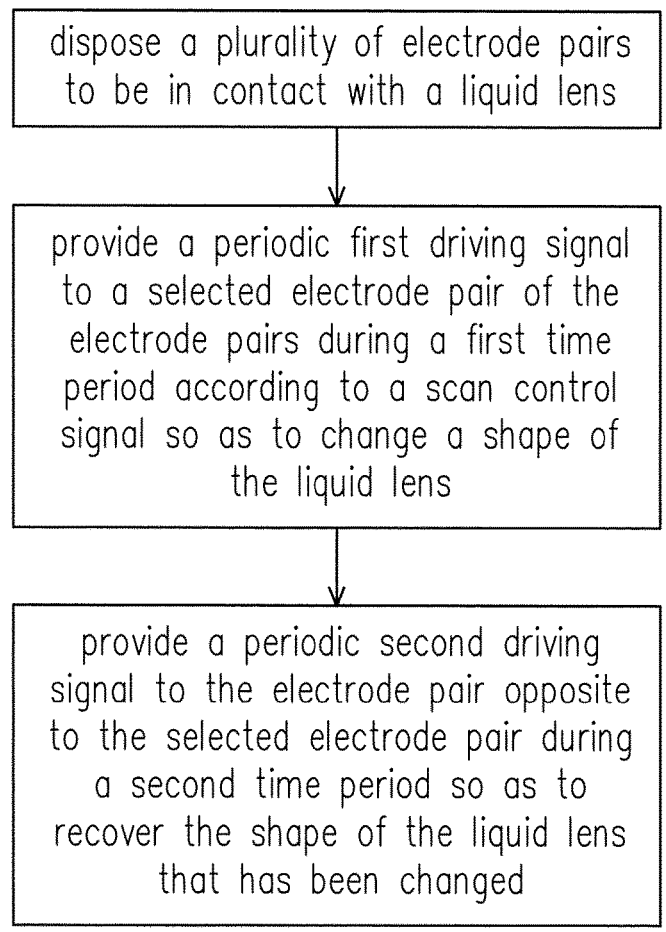
FIG. 6 is a flowchart illustrating a driving method of the liquid lens according to an embodiment of the invention.

Hereinafter, referring to FIG. 6, FIG. 6 is a flowchart illustrating a driving method of the liquid lens according to an embodiment of the invention. In Step S610, a plurality of electrode pairs and the liquid lens are disposed in contact with each other; then, in Step S620, a periodic first driving signal is provided to a selected electrode pair of the electrode pairs during a first time period according to the scan control signal so as to change the shape of the liquid lens; and in Step S630, a periodic second driving signal is provided to the electrode pair opposite to the selected electrode pair during the second time period so as to recover the shape of the liquid lens that has been changed.

Details of the steps described above have been specified in the above embodiments and thus are not repeated hereinafter.

Figure 7A:
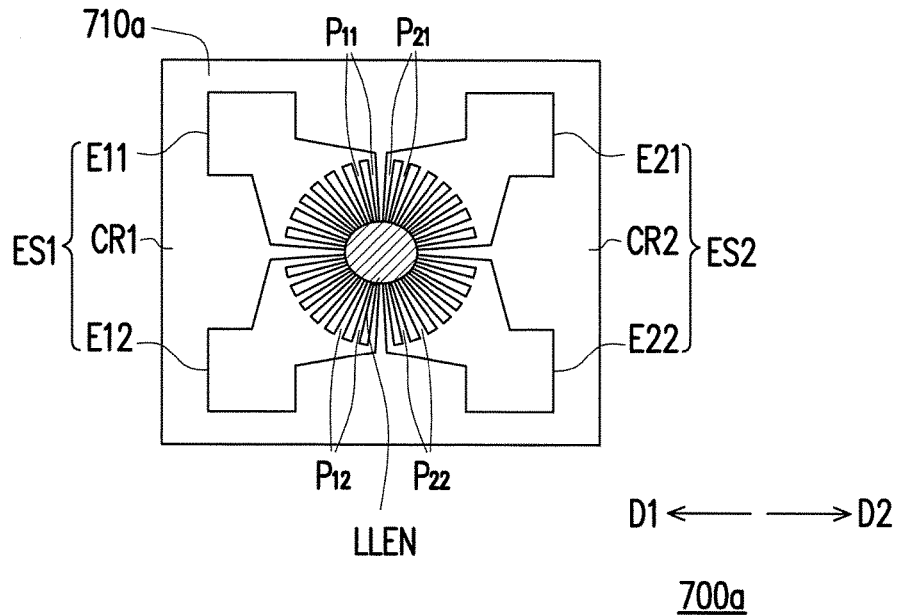
FIG. 7A is a schematic diagram illustrating a liquid lens chip according to an embodiment of the invention.

Referring to FIG. 7A, FIG. 7A is a schematic diagram illustrating a liquid lens chip according to an embodiment of the invention. A liquid lens chip 700a includes the liquid lens LLEN and a carrier 710a. The carrier 710a includes a plurality of electrode pairs ES1 and ES2 that are arranged opposite to each other. In this embodiment, the plurality of electrode pairs are a first direction electrode pair ES1 and a second direction electrode pair ES2, for example. Nevertheless, the invention is not intended to limit the number of the electrode pairs. The first direction electrode pair ES1 and the second direction electrode pair ES2 are arranged opposite to each other. Specifically, a direction from the liquid lens LLEN to the first direction electrode pair ES1 (toward a central portion CR1 of the first direction electrode pair ES1, for example, but not limited thereto) is a first direction D1. A direction from the liquid lens LLEN to the second direction electrode pair ES2 (toward a central portion CR2 of the second direction electrode pair ES2, for example, but not limited thereto) is a second direction D2.

The electrode pair ES1 has a plurality of extension parts P11 and P12. The electrode pair ES2 has a plurality of extension parts P21 and P22. The extension parts P11 and P12 of the electrode pair ES1 extend in a direction toward the liquid lens LLEN. Each of the extension parts P11, P12, P21, and P22 has a needle shape, for example. The extension parts P21 and P22 of the electrode pair ES2 extend in a direction toward the liquid lens LLEN. It is known from FIG. 7A that the extension parts P11, P12, P21, and P22 of the electrode pairs ES1 and ES2 are arranged radially around the liquid lens LLEN.

Figure 7B:
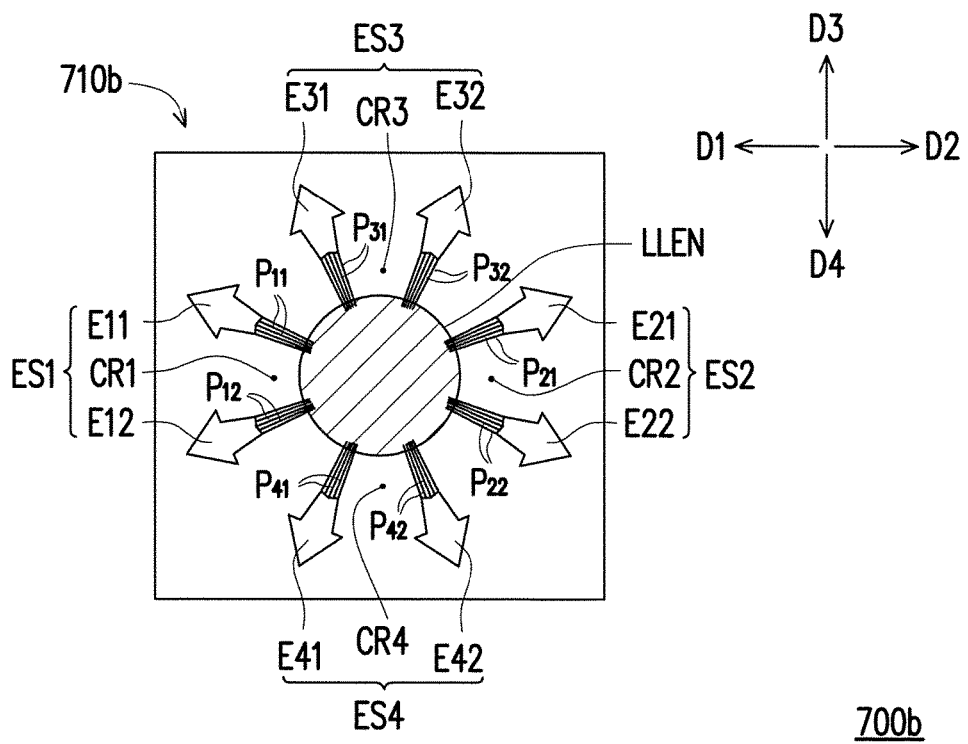
FIG. 7B is a schematic diagram illustrating a liquid lens chip according to another embodiment of the invention.

Referring to FIG. 7B, a liquid lens chip 700b of FIG. 7B is similar to the liquid lens chip 700a of FIG. 7A, and a main difference lies in that: in addition to the first direction electrode pair ES1 and the second direction electrode pair ES2, a carrier 710b of the liquid lens chip 700b further includes a third direction electrode pair ES3 and a fourth direction electrode pair ES4. The fourth direction electrode pair ES4 and the first direction electrode pair ES1 are arranged opposite to each other. A direction from the liquid lens LLEN to the third direction electrode pair ES3 (toward a central portion CR3 of the third direction electrode pair ES3, for example, but not limited thereto) is a third direction D3. A direction from the liquid lens LLEN to the fourth direction electrode pair ES4 (toward a central portion CR4 of the fourth direction electrode pair ES4, for example, but not limited thereto) is a fourth direction D4. The third direction D3 and the fourth direction D4 are opposite to each other. The first direction D1 is substantially perpendicular to the third direction D3.

Moreover, in this embodiment, the electrode pair ES3 has a plurality of extension parts P31 and P32. The electrode pair ES4 has a plurality of extension parts P41 and P42. Each of the extension parts P11, P12, P21, P22, P31, P32, P41, and P42 has a needle shape, for example, but not limited thereto. The extension parts P31 and P32 of the electrode pair ES3 extend in a direction toward the liquid lens LLEN. The extension parts P41 and P42 of the electrode pair ES4 extend in a direction toward the liquid lens LLEN. It is known from FIG. 7B that the extension parts P11, P12, P21, P22, P31, P32, P41, and P42 of the electrode pairs ES1, ES2, ES3, and ES4 are arranged radially around the liquid lens LLEN. In addition, in this embodiment, the extension parts P11, P12, P21, P22, P31, P32, P41, and P42 have equal lengths.

In conclusion, the carrier provided by the invention includes multiple electrode pairs that are arranged opposite to one another. By sequentially providing the driving signals to two opposite electrode pairs, the shape change rate and shape recovery rate of the liquid lens are increased effectively, so as to raise the image scan speed and thereby improve the resolution of the scanned image.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A driving apparatus of a liquid lens, comprising:
   a carrier carrying the liquid lens and comprising a plurality of electrode pairs that are in contact with the liquid lens; and
   a driver providing a periodic first driving signal to a selected electrode pair of the electrode pairs during a first time period according to a scan control signal to change a shape of the liquid lens, and providing a periodic second driving signal to an opposite electrode pair opposite to the selected electrode pair during a second time period to recover the shape of the liquid lens that has been changed, wherein the driver comprises:
   a controller generating a scan enabling signal and the scan control signal according to a scan instruction;
   a periodic signal generator coupled to the controller and generating the first driving signal and the second driving signal according to the scan enabling signal; and
   a selector coupled to the controller, the periodic signal generator, and the electrode pairs and, according to the scan control signal, enabling the first driving signal to be provided to the selected electrode pair during the first time period and enabling the second driving signal to be provided to the opposite electrode pair during the second time period.

2. The driving apparatus of the liquid lens according to claim 1, wherein the first driving signal and the second driving signal have the same or different waveforms, amplitudes, frequencies, and phases.

3. The driving apparatus of the liquid lens according to claim 1, wherein the driver and the carrier are disposed on a chip or respectively disposed on different chips.

4. The driving apparatus of the liquid lens according to claim 1, wherein the driver is coupled to the electrode pairs on the carrier via a plurality of package wires.

5. The driving apparatus of the liquid lens according to claim 1, wherein the first time period and the second time period are continuous time periods.

6. The driving apparatus of the liquid lens according to claim 1, wherein the electrode pairs comprise:
a first direction electrode pair; and
a second direction electrode pair arranged opposite to the first direction electrode pair,
wherein during the first time period, the first direction electrode pair receives the first driving signal and the shape of the liquid lens is changed along a first direction; and during the second time period, the second direction electrode pair receives the second driving signal, wherein when the second direction electrode pair receives the second driving signal, the shape of the liquid lens that has been changed is recovered along a second direction, and wherein the first direction and the second direction are opposite to each other.

7. The driving apparatus of the liquid lens according to claim 6, wherein the electrode pairs further comprise:
a third direction electrode pair; and
a fourth direction electrode pair arranged opposite to the third direction electrode pair,
wherein during a third time period, the third direction electrode pair receives the first driving signal and the shape of the liquid lens is changed along a third direction; and during a fourth time period, the fourth direction electrode pair receives the second driving signal, wherein when the fourth direction electrode pair receives the second driving signal, the shape of the liquid lens that has been changed is recovered along a fourth direction, and wherein the third direction and the fourth direction are opposite to each other, and the first direction is substantially perpendicular to the third direction.

8. The driving apparatus of the liquid lens according to claim 6, wherein during the first time period, when the first direction electrode pair receives the first driving signal, the second direction electrode pair does not receive the second driving signal; and during the second time period, when the second direction electrode pair receives the second driving signal, the first direction electrode pair does not receive the first driving signal.

9. The driving apparatus of the liquid lens according to claim 1, wherein the carrier comprises:
a plurality of electrode pairs arranged opposite to one another and together surrounding the liquid lens, wherein each of the electrode pairs has a plurality of extension parts that extend in a direction toward the liquid lens, wherein the liquid lens is in contact with the extension parts of each of the electrode pairs and is electrically connected with the electrode pairs.

10. A driving method of a liquid lens, adapted for a driver, wherein the driver comprises a controller, a periodic signal generator coupled to the controller, and a selector coupled to the controller and the periodic signal generator, the driving method comprising:
disposing a plurality of electrode pairs to be in contact with the liquid lens and to be coupled to the selector;
providing a periodic first driving signal by a driver to a selected electrode pair of the electrode pairs during a first time period according to a scan control signal to change a shape of the liquid lens; and
providing a periodic second driving signal by the driver to an opposite electrode pair opposite to the selected electrode pair during a second time period to recover the shape of the liquid lens that has been changed;
wherein step of providing the periodic first driving signal by the driver and step of providing the periodic second driving signal by the driver comprises:
generating a scan enabling signal and the scan control signal by the controller according to a scan instruction;
generating the first driving signal and the second driving signal by the periodic signal generator according to the scan enabling signal; and
enabling the first driving signal to be provided to the selected electrode pair during the first time period according to the scan control signal and enabling the second driving signal to be provided to the opposite electrode pair during the second time period according to the scan control signal by the selector.

11. The driving method of the liquid lens according to claim 10, wherein the first driving signal and the second driving signal have the same or different signals waveforms, amplitudes, frequencies, and phases.

12. The driving method of the liquid lens according to claim 11, wherein the first time period and the second time period are continuous time periods.

* * * * *